(12) United States Patent
Nagai et al.

(10) Patent No.: US 12,315,952 B2
(45) Date of Patent: May 27, 2025

(54) BATTERY MODULE

(71) Applicant: TOYOTA JIDOSHA KABUSHIKI KAISHA, Toyota (JP)

(72) Inventors: Hiroki Nagai, Ama-gun (JP); Takaaki Matsui, Toyota (JP); Takafumi Nose, Nagoya (JP); Koichiro Isobe, Toyota (JP); Ryo Nogimura, Kounosu (JP); Kazuyuki Kanai, Maebashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 560 days.

(21) Appl. No.: 17/752,429

(22) Filed: May 24, 2022

(65) Prior Publication Data

US 2023/0018565 A1   Jan. 19, 2023

(30) Foreign Application Priority Data

Jul. 19, 2021   (JP) ................................. 2021-118741

(51) Int. Cl.
  *H01M 50/291*   (2021.01)
  *H01M 10/04*   (2006.01)
  *H01M 50/209*   (2021.01)
  *H01M 50/242*   (2021.01)
  *H01M 50/293*   (2021.01)

(52) U.S. Cl.
  CPC ..... *H01M 50/291* (2021.01); *H01M 10/0481* (2013.01); *H01M 50/209* (2021.01); *H01M 50/242* (2021.01); *H01M 50/293* (2021.01)

(58) Field of Classification Search
  None
  See application file for complete search history.

(56) References Cited

U.S. PATENT DOCUMENTS

2006/0240318 A1* 10/2006 Kim .................... H01M 10/613
429/153

FOREIGN PATENT DOCUMENTS

| JP | 2014-102939 A | 6/2014 |
| JP | 6211757 B2 | 10/2017 |
| JP | 2020-004556 A | 1/2020 |
| KR | 101219237 B1 * | 1/2013 |

OTHER PUBLICATIONS

Machine Translation of KR-101219237-B1 (Year: 2013).*

* cited by examiner

*Primary Examiner* — Gregg Cantelmo
(74) *Attorney, Agent, or Firm* — Oliff PLC (57) ABSTRACT

A battery module includes: a plurality of battery cells each of which has a flat shape; a plurality of elastic spacers laminated and disposed alternately with the battery cells; and a restraining member configured to restrain the battery cells and the elastic spacers in a laminating direction of the battery cells. Each of the elastic spacers has a sheet portion that extends between two adjacent battery cells and a plurality of protrusions that protrudes from one surface of the sheet portion. The protrusions are disposed at an equal interval along at least a first direction. When an interval between the protrusions in the first direction is x and a dimension of each protrusion in the first direction is y, relationships of 4 mm≤y≤18 mm, y≥4/9x−10/3, and y≤x−2 are satisfied.

4 Claims, 9 Drawing Sheets

| LEVEL | INTERVAL x BETWEEN PROTRUSIONS [mm] | DIAMETER y OF PROTRUSION [mm] | RESISTANCE INCREASE RATE [%] | DETERMINATION | CAPACITY MAINTENANCE RATE [%] | DETERMINATION |
|---|---|---|---|---|---|---|
| 1 | 16 | 5 | 100 | A | 80 | A |
| 2 | 30 | 11 | 100 | A | 81 | A |
| 3 | 16 | 4 | 100 | A | 88 | A |
| 4 | 30 | 10 | 100 | A | 80 | A |
| 5 | 48 | 18 | 100 | A | 83 | A |
| 6 | 16 | 3 | 100 | A | 75 | B |
| 7 | 30 | 9 | 100 | A | 74 | B |
| 8 | 48 | 17 | 100 | A | 77 | B |
| 9 | 16 | 2 | 100 | A | 74 | B |
| 10 | 30 | 8 | 100 | A | 76 | B |
| 11 | 48 | 16 | 100 | A | 79 | B |
| 12 | 6 | 5 | 100 | A | 79 | B |
| 13 | 8 | 5 | 100 | A | 83 | A |
| 14 | 10 | 5 | 100 | A | 83 | A |
| 15 | 16 | 5 | 100 | A | 84 | A |
| 16 | 6 | 4 | 100 | A | 81 | A |
| 17 | 8 | 4 | 100 | A | 80 | A |
| 18 | 10 | 4 | 100 | A | 82 | A |
| 19 | 16 | 4 | 100 | A | 80 | A |
| 20 | 4 | 3 | 100 | A | 77 | B |
| 21 | 6 | 3 | 100 | A | 78 | B |
| 22 | 8 | 3 | 100 | A | 75 | B |
| 23 | 10 | 3 | 100 | A | 77 | B |
| 24 | 16 | 3 | 100 | A | 78 | B |
| 25 | 22 | 18 | 100 | A | 84 | A |
| 26 | 20 | 16 | 100 | A | 82 | A |
| 27 | 18 | 14 | 100 | A | 84 | A |
| 28 | 16 | 12 | 100 | A | 82 | A |
| 29 | 10 | 6 | 100 | A | 81 | A |

FIG. 6

| LEVEL | INTERVAL x BETWEEN PROTRUSIONS [mm] | DIAMETER y OF PROTRUSION [mm] | RESISTANCE INCREASE RATE | | CAPACITY MAINTENANCE RATE | |
|---|---|---|---|---|---|---|
| | | | RESISTANCE INCREASE RATE [%] | DETERMINATION | CAPACITY MAINTENANCE RATE [%] | DETERMINATION |
| 30 | 8 | 4 | 100 | A | 82 | A |
| 31 | 20 | 18 | 100 | A | 80 | A |
| 32 | 18 | 16 | 100 | A | 81 | A |
| 33 | 16 | 14 | 100 | A | 80 | A |
| 34 | 14 | 12 | 100 | A | 80 | A |
| 35 | 8 | 6 | 100 | A | 81 | A |
| 36 | 6 | 4 | 100 | A | 80 | A |
| 37 | 18 | 18 | 105 | B | 80 | A |
| 38 | 16 | 16 | 106 | B | 81 | A |
| 39 | 14 | 14 | 105 | B | 82 | A |
| 40 | 12 | 12 | 106 | B | 80 | A |
| 41 | 6 | 6 | 108 | B | 81 | A |
| 42 | 4 | 4 | 108 | B | 80 | A |
| 43 | 48 | 16 | 100 | A | 80 | A |
| 44 | 40 | 16 | 100 | A | 81 | A |
| 45 | 32 | 16 | 100 | A | 80 | A |
| 46 | 24 | 16 | 100 | A | 81 | A |
| 47 | 20 | 16 | 100 | A | 81 | A |
| 48 | 48 | 18 | 100 | A | 80 | A |
| 49 | 40 | 18 | 100 | A | 81 | A |
| 50 | 32 | 18 | 100 | A | 80 | A |
| 51 | 24 | 18 | 100 | A | 81 | A |
| 52 | 20 | 18 | 100 | A | 81 | A |
| 53 | 48 | 19 | 105 | B | 80 | A |
| 54 | 40 | 19 | 104 | B | 82 | A |
| 55 | 32 | 19 | 104 | B | 80 | A |
| 56 | 24 | 19 | 102 | B | 81 | A |
| 57 | 20 | 19 | 102 | B | 81 | A |

| LEVEL | VOLUME FRACTION V OF PROTRUSION [%] | RESISTANCE INCREASE RATE [%] | DETERMINATION | CAPACITY MAINTENANCE RATE [%] | DETERMINATION |
|---|---|---|---|---|---|
| 1 | 10 | 100 | A | 73 | B |
| 2 | 11 | 100 | A | 75 | B |
| 3 | 12 | 100 | A | 76 | B |
| 4 | 13 | 100 | A | 79 | B |
| 5 | 14 | 100 | A | 80 | A |
| 6 | 15 | 100 | A | 80 | A |
| 7 | 16 | 100 | A | 80 | A |
| 8 | 17 | 100 | A | 80 | A |
| 9 | 18 | 100 | A | 80 | A |
| 10 | 19 | 100 | A | 80 | A |
| 11 | 20 | 100 | A | 80 | A |
| 12 | 21 | 99 | A | 80 | A |
| 13 | 22 | 100 | A | 80 | A |
| 14 | 23 | 100 | A | 80 | A |
| 15 | 24 | 100 | A | 80 | A |
| 16 | 25 | 100 | A | 80 | A |
| 17 | 26 | 99 | A | 80 | A |
| 18 | 27 | 100 | A | 80 | A |
| 19 | 28 | 100 | A | 80 | A |
| 20 | 29 | 100 | A | 80 | A |
| 21 | 30 | 100 | A | 81 | A |
| 22 | 31 | 100 | A | 80 | A |
| 23 | 32 | 100 | A | 80 | A |
| 24 | 33 | 100 | A | 80 | A |
| 25 | 34 | 100 | A | 80 | A |
| 26 | 35 | 100 | A | 81 | A |
| 27 | 36 | 100 | A | 80 | A |
| 28 | 37 | 100 | A | 80 | A |
| 29 | 38 | 100 | A | 80 | A |
| 30 | 39 | 101 | B | 80 | A |
| 31 | 40 | 106 | B | 80 | A |
| 32 | 41 | 107 | B | 80 | A |
| 33 | 42 | 107 | B | 80 | A |
| 34 | 43 | 107 | B | 80 | A |
| 35 | 44 | 107 | B | 82 | A |
| 36 | 45 | 107 | B | 81 | A |
| 37 | 46 | 107 | B | 80 | A |
| 38 | 47 | 106 | B | 80 | A |
| 39 | 48 | 107 | B | 80 | A |
| 40 | 49 | 107 | B | 80 | A |
| 41 | 50 | 107 | B | 80 | A |

BATTERY MODULE

CROSS-REFERENCE TO RELATED APPLICATION

This application claims priority to Japanese Patent Application No. 2021-118741 filed on Jul. 19, 2021, incorporated herein by reference in its entirety.

BACKGROUND

1. Technical Field

The present disclosure relates to a battery module.

2. Description of Related Art

Japanese Unexamined Patent Application Publication No. 2020-004556 (JP 2020-004556 A) discloses a battery module. In the battery module, a plurality of battery cells each of which has a flat shape, and an elastic spacer having a sheet portion and a plurality of protrusions are laminated and disposed, and these components are restrained by a restraining member.

SUMMARY

In the battery cell having a flat shape, a positive electrode and a negative electrode are laminated via a separator, and a region between the positive electrode and the negative electrode is filled with an electrolyte. With such a configuration, the battery cell expands in a laminating direction as the battery cell is charged, and the battery cell contracts in the laminating direction as the battery cell is discharged. In this case, since a laminating direction of both electrodes in the battery cell coincides with the laminating direction of the battery cells, the expansion of the battery cell is restricted by the restraining member and the elastic spacer. With this, an increase in distance between both electrodes in the battery cell is suppressed, so that a decrease in capacity of the battery cell is suppressed. However, for example, the expansion of the battery cell may be restricted more than needed depending on a size and shape of the protrusion of the elastic spacer. In this case, the electrolyte may be discharged to an outside of the region between both electrodes, and a resistance value of the battery cell may increase unintentionally.

The present disclosure provides a technique for suppressing or avoiding an increase in resistance value of a battery cell and suppressing a decrease in capacity of the battery cell.

A first aspect of the present disclosure relates to a battery module. The battery module includes: a plurality of battery cells each of which has a flat shape; a plurality of elastic spacers laminated and disposed alternately with the battery cells; and a restraining member configured to restrain the battery cells and the elastic spacers in a laminating direction of the battery cells. Each of the elastic spacers has a sheet portion that extends between two adjacent battery cells and a plurality of protrusions that protrudes from one surface of the sheet portion. The protrusions are disposed at an equal interval along at least a first direction. When an interval between the protrusions in the first direction is x and a dimension of each protrusion in the first direction is y, relationships of 4 mm≤y≤18 mm, y≥4/9x−10/3, and y≤x−2 are satisfied.

In the first aspect of the present disclosure, the protrusions may be further disposed at an equal interval along a second direction perpendicular to the first direction, an interval between the protrusions in the second direction may be equal to the interval between the protrusions in the first direction, and a dimension of each protrusion in the second direction may be equal to the dimension of each protrusion in the first direction.

In the first aspect of the present disclosure, each protrusion may have a cylindrical shape.

In the first aspect of the present disclosure, in the elastic spacer having a natural shape removed from the battery module, when a plane that is in contact with tips of the protrusions and extends in parallel with the sheet portion is defined as a tangent plane, a volume fraction of a region occupied by the protrusions in a region located between the sheet portion and the tangent plane may be 14% or more and 38% or less.

A second aspect of the present disclosure relates to a battery module. The battery module includes: a plurality of battery cells each of which has a flat shape; a plurality of elastic spacers laminated and disposed alternately with the battery cells; and a restraining member configured to restrain the battery cells and the elastic spacers in a laminating direction of the battery cells. Each of the elastic spacers has a sheet portion that extends between two adjacent battery cells and a plurality of protrusions that protrudes from one surface of the sheet portion. In the elastic spacer having a natural shape removed from the battery module, when a plane that is in contact with tips of the protrusions and extends in parallel with the sheet portion is defined as a tangent plane, a volume fraction of a region occupied by the protrusions in a region located between the sheet portion and the tangent plane is 14% or more and 38% or less.

In the second aspect of the present disclosure, the protrusions may have the same shape as each other.

In the second aspect of the present disclosure, the protrusions may be disposed at an equal interval along at least a first direction.

In the second aspect of the present disclosure, a surface of the battery cell in contact with the protrusions of the elastic spacer may have a rectangular shape having four corners, a pair of short sides, and a pair of long sides, and when a length of 5% of the short side is defined as a first length, and a triangular region having, as apices, the corner, a point on the short side separated from the corner by the first length, and a point on the long side separated from the corner by the first length is defined as a corner-adjacent region for each of the four corners, none of the protrusions of the elastic spacer may be in contact with the corner-adjacent region on the surface of the battery cell.

In the battery module, the battery cells and the elastic spacers having the protrusions are alternately laminated and disposed, and the battery cells and the elastic spacers are restrained by the restraining member in a direction in which the battery cells and the elastic spacers are laminated. With this, the expansion of the battery cell is restricted by the restraining member and the elastic spacer. In addition, the protrusions provided on the elastic spacer are disposed at an equal interval along at least the first direction, and are configured to satisfy a predetermined relationship. The predetermined relationship mentioned here refers to relationships of 4 mm≤y≤18 mm, y≥4/9x−10/3, and y≤x−2, where an interval between the protrusions in the first direction is x and a dimension of each protrusion in the first direction is y. With such a configuration, it is possible to suppress the increase in distance between both electrodes in the battery cell while avoiding restricting the expansion of the battery cell more than needed. With this, it is possible to suppress or avoid the unintentional increase in resistance value of the battery cell by suppressing the discharge of the electrolyte to the outside of the region between both electrodes, and to suppress the decrease in capacity of the battery cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present disclosure, a plurality of protrusions may be further disposed at an equal interval along a second direction perpendicular to a first direction. In this case, an interval between the protrusions in the second direction may be equal to an interval between the protrusions in the first direction, and a dimension of each protrusion in the second direction may be equal to a dimension of each protrusion in the first direction. With such a configuration, it is possible to avoid local concentration of a load applied from the protrusion of the elastic spacer to the adjacent battery cell when the battery cell expands. With this, it is possible to more reliably avoid restricting the expansion of the battery cell more than needed.

In one embodiment of the present disclosure, each protrusion may have a cylindrical shape. With such a configuration, for each protrusion of the elastic spacer, when the battery cell expands, an area of contact between the protrusion and the adjacent battery cell becomes constant regardless of an expansion amount of the battery cell. With this, it is possible to avoid the local concentration of the load applied from each protrusion to the adjacent battery cell. Note that, as another embodiment, each protrusion need not necessarily have a cylindrical shape, and may have, for example, a hemispherical shape, a trapezoidal shape, or a prismatic shape.

In the above embodiment, in the elastic spacer having a natural shape removed from the battery module, when a plane that is in contact with tips of the protrusions and extends in parallel with a sheet portion is defined as a tangent plane, a volume fraction of a region occupied by the protrusions in a region located between the sheet portion and the tangent plane may be 14% or more and 38% or less. With such a configuration, it is possible to suppress an increase in distance between both electrodes in the battery cell while more reliably avoiding restricting the expansion of the battery cell more than needed. The natural shape is a shape after the shape of the elastic spacer removed from the battery module is recovered by restoring force. The natural shape may be a shape after the shape of the elastic spacer removed from the battery module immediately after assembling the battery module is recovered by restoring force.

The present disclosure also relates to the following battery module. The battery module includes: a plurality of battery cells each of which has a flat shape; a plurality of elastic spacers laminated and disposed alternately with the battery cells; and a restraining member configured to restrain the battery cells and the elastic spacers in a laminating direction of the battery cells. Each of the elastic spacers has a sheet portion that extends between two adjacent battery cells and a plurality of protrusions that protrudes from one surface of the sheet portion. In the elastic spacer having a natural shape removed from the battery module, when a plane that is in contact with tips of the protrusions and extends in parallel with the sheet portion is defined as a tangent plane, a volume fraction of a region occupied by the protrusions in a region located between the sheet portion and the tangent plane is 14% or more and 38% or less.

Also in the battery module, the battery cells and the elastic spacers having the protrusions are alternately laminated and disposed, and the battery cells and the elastic spacers are restrained by the restraining member in a direction in which the battery cells and the elastic spacers are laminated. With this, the expansion of the battery cell is restricted by the restraining member and the elastic spacer. In addition, the elastic spacer having a natural shape removed from the battery module is configured to satisfy a predetermined relationship. The predetermined relationship mentioned here refers to a relationship in which when a plane that is in contact with tips of the protrusions and extends in parallel with the sheet portion is defined as a tangent plane, a volume fraction of a region occupied by the protrusions in a region located between the sheet portion and the tangent plane is 14% or more and 38% or less. With such a configuration, it is possible to suppress the increase in distance between both electrodes in the battery cell while avoiding restricting the expansion of the battery cell more than needed. With this, it is possible to suppress or avoid an unintentional increase in resistance value of the battery cell by suppressing a discharge of an electrolyte to the outside of a region between both electrodes, and to suppress a decrease in capacity of the battery cell.

In the above embodiment, the protrusions may have the same shape as each other. With such a configuration, for each protrusion of the elastic spacer, an area of contact between the protrusion and the adjacent battery cell becomes equal when the battery cell expands. With this, it is possible to avoid the local concentration of the load applied from the protrusion of the elastic spacer to the adjacent battery cell when the battery cell expands.

In the above embodiment, the protrusions may be disposed at an equal interval along at least the first direction. With such a configuration, it is possible to avoid the local concentration of the load applied from the protrusion of the elastic spacer to the adjacent battery cell when the battery cell expands. The protrusions need only be disposed at an equal interval along the first direction. Note that the protrusions may be disposed at an equal interval along the second direction in addition to the first direction.

In some embodiments described above, a surface of the battery cell in contact with the protrusions of the elastic spacer may have a rectangular shape having four corners, a pair of short sides, and a pair of long sides. In this case, when a length of 5% of the short side is defined as a first length, and a triangular region having, as apices, the corner, a point on the short side separated from the corner by the first length, and a point on the long side separated from the corner by the first length is defined as a corner-adjacent region for each of the four corners, none of the protrusions of the elastic spacer may be in contact with the corner-adjacent region on the surface of the battery cell. Within the surface of the battery cell, the corner-adjacent region has a relatively high rigidity, and a region other than the corner-adjacent region has a relatively low rigidity. Therefore, when the battery cell expands, the load applied to the battery cell from the protrusion of the elastic spacer can be effectively transmitted to the inside of the battery cell, and the increase in distance between both electrodes in the battery cell can be suppressed. With this, the decrease in capacity of the battery cell is suppressed or avoided.

Figure 1:
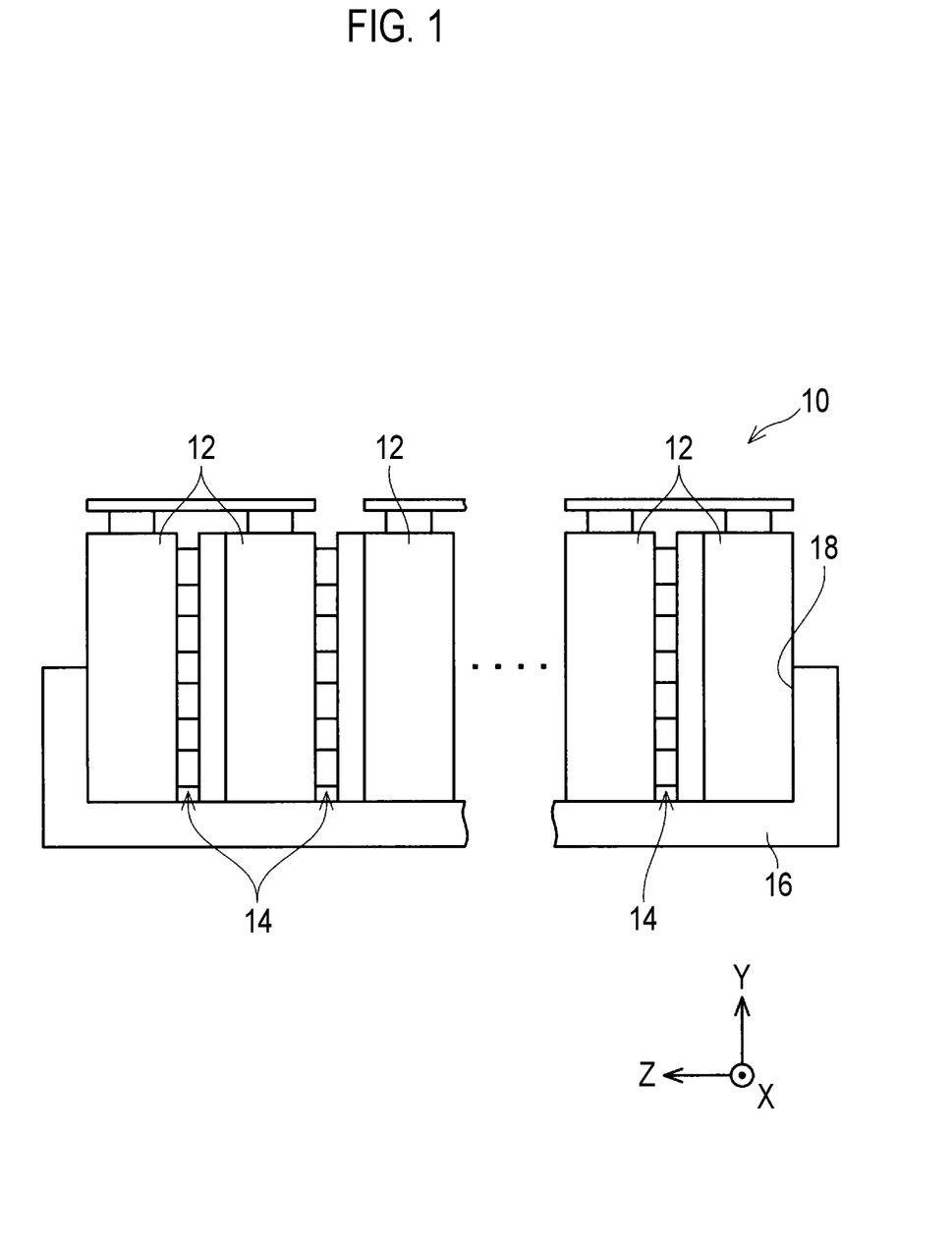
FIG. 1 is a schematic diagram showing a configuration of a battery module of an example.

A battery module 10 according to the embodiment of the present disclosure will be described with reference to the drawings. The battery module 10 is used, for example, as a power source for an electrified vehicle. As shown in FIG. 1, the battery module 10 includes a plurality of battery cells 12. Each battery cell 12 is a secondary battery cell that can be repeatedly charged and discharged, for example, a lithium ion secondary battery cell. Each battery cell 12 has a flat shape and is disposed in parallel with an X direction and a Y direction. The battery cells 12 are disposed along a Z direction. Here, the X direction, the Y direction, and the Z direction are orthogonal to one another. The specific number of the battery cells 12 is not particularly limited, and can be appropriately changed according to an output voltage needed for the battery module 10.

Although not shown, inside each battery cell 12, a positive electrode and a negative electrode are laminated in the Z direction via a separator and an electrolyte. In this case, although not particularly limited, inside each battery cell 12, a plurality of sheet materials constituting the positive electrode and a plurality of sheet materials constituting the negative electrode may be alternately laminated via a separator. Alternatively, a long sheet material constituting the positive electrode and a long sheet material constituting the negative electrode may be wound flat via a separator.

Figure 2:
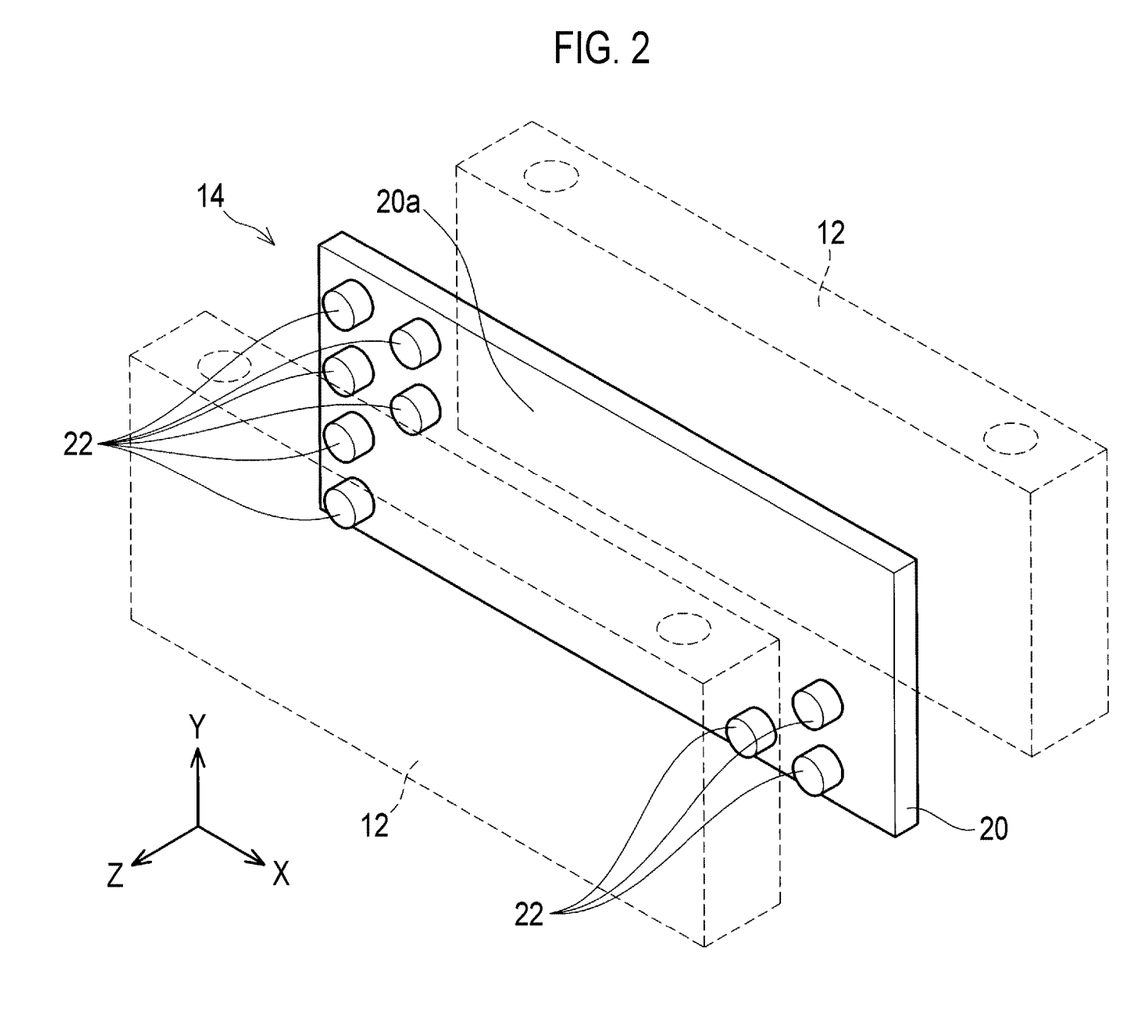
FIG. 2 is a diagram illustrating an elastic spacer disposed between two adjacent battery cells, in which the two adjacent battery cells are shown by a broken line.

As shown in FIGS. 1 and 2, the battery module 10 further includes a plurality of elastic spacers 14. The elastic spacers 14 are laminated and disposed along the Z direction alternately with the battery cells 12. That is, one elastic spacer 14 is disposed between the two adjacent battery cells 12. The elastic spacers 14 can be elastically deformed according to a load from the battery cell 12. As an example, the elastic spacers 14 are made of an elastic material, such as a rubber material or a resin.

As shown in FIG. 2, each elastic spacer 14 includes a sheet portion 20 and a plurality of protrusions 22. The sheet portion 20 extends between the two adjacent battery cells 12. The protrusions 22 protrude from one surface 20a of the sheet portion 20 and abut on the adjacent battery cell 12. With such a configuration, the elastic spacer 14 can be elastically deformed more flexibly according to the load from the battery cell 12. The specific number of the elastic spacers 14 is not particularly limited, and can be appropriately changed according to the number of the battery cells 12.

Figure 3:
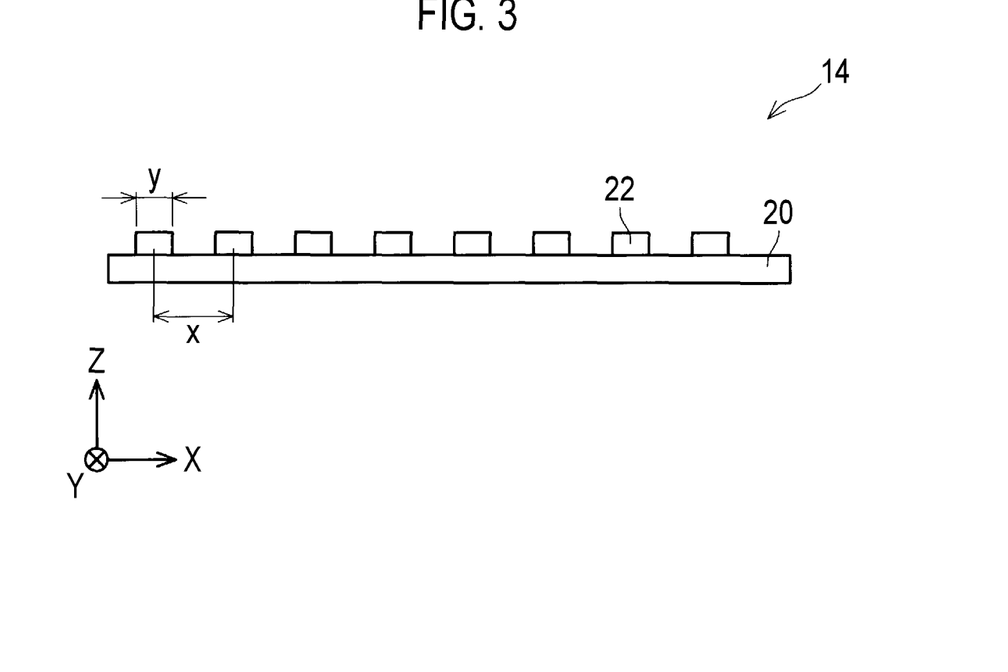
FIG. 3 is a side view of the elastic spacer.
Figure 4:
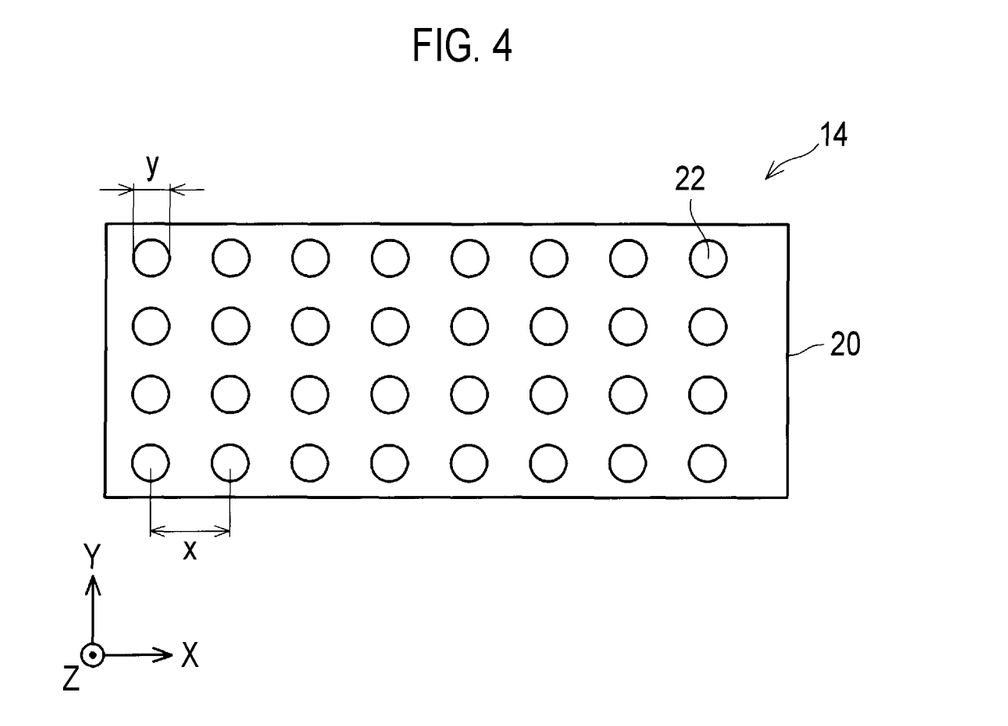
FIG. 4 is a plan view of the elastic spacer.

As shown in FIGS. 3 and 4, the protrusions 22 are disposed at an equal interval with an interval x along the X direction and the Y direction. That is, the two protrusions 22 adjacent in the X direction are disposed at the interval x, and the two protrusions 22 adjacent in the Y direction are also disposed at the interval x. In the present disclosure, the interval x between the two protrusions 22 means a distance between the centers of the two protrusions 22. Each protrusion 22 has a cylindrical shape with a diameter y. That is, a dimension of the protrusion 22 in the first direction is y, and a dimension of the protrusion 22 in the second direction is also y.

Here, the X direction in the present example is an example of the first direction in the present disclosure. The Y direction in the present example is an example of the second direction in the present disclosure. The Z direction in the present example is an example of the laminating direction in the present disclosure.

Returning to FIG. 1, the battery module 10 further includes a restraining member 16. The restraining member 16 has a substantially rectangular parallelepiped shape and has an opening 18 that is open upward. The laminated battery cells 12 and elastic spacers 14 are disposed in the opening 18. With this, the restraining member 16 restrains the battery cells 12 and the elastic spacers 14 in a laminating direction (that is, the Z direction) of the battery cells 12 and the elastic spacers 14. Therefore, when the battery cells 12 expand, the expansion of the battery cell 12 is restricted by the restraining member 16. The specific shape and configuration of the restraining member 16 are not particularly limited.

As described above, in the battery module 10 of the present example, the battery cells 12 and the elastic spacers 14 are alternately laminated and disposed along the Z direction. Here, inside each battery cell 12, the positive electrode and the negative electrode are also laminated in the Z direction. Accordingly, each battery cell 12 expands in the laminating direction (that is, the Z direction) with charging and contracts in the laminating direction (that is, the Z direction) with discharging. When the battery cell 12 expands, the elastic spacer 14 adjacent to the battery cell 12 is compressed, so that the expansion of the battery cell 12 is suppressed by elastic force of the elastic spacer 14. With this, an increase in distance between both electrodes in the battery cell 12 is suppressed, so that a decrease in capacity of the battery cell 12 is suppressed. However, in a case where the elastic force of the elastic spacer 14 is too strong, the expansion of the battery cell 12 may be restricted more than needed. In this case, the electrolyte may be discharged to the outside of the region between both electrodes, and a resistance value of the battery cell 12 may increase unintentionally.

Figure 5:
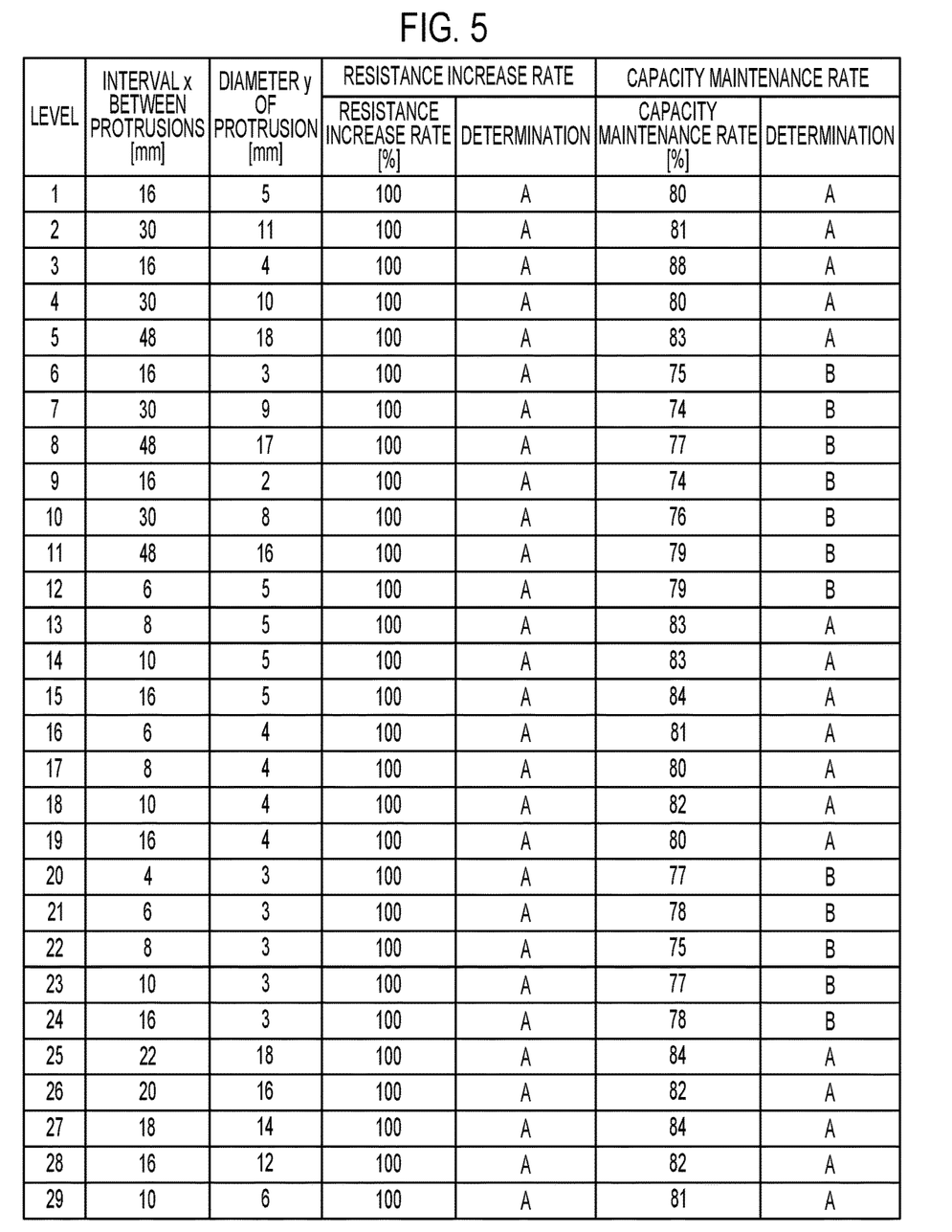
FIG. 5 is a table showing cycle test results.
Figure 6:
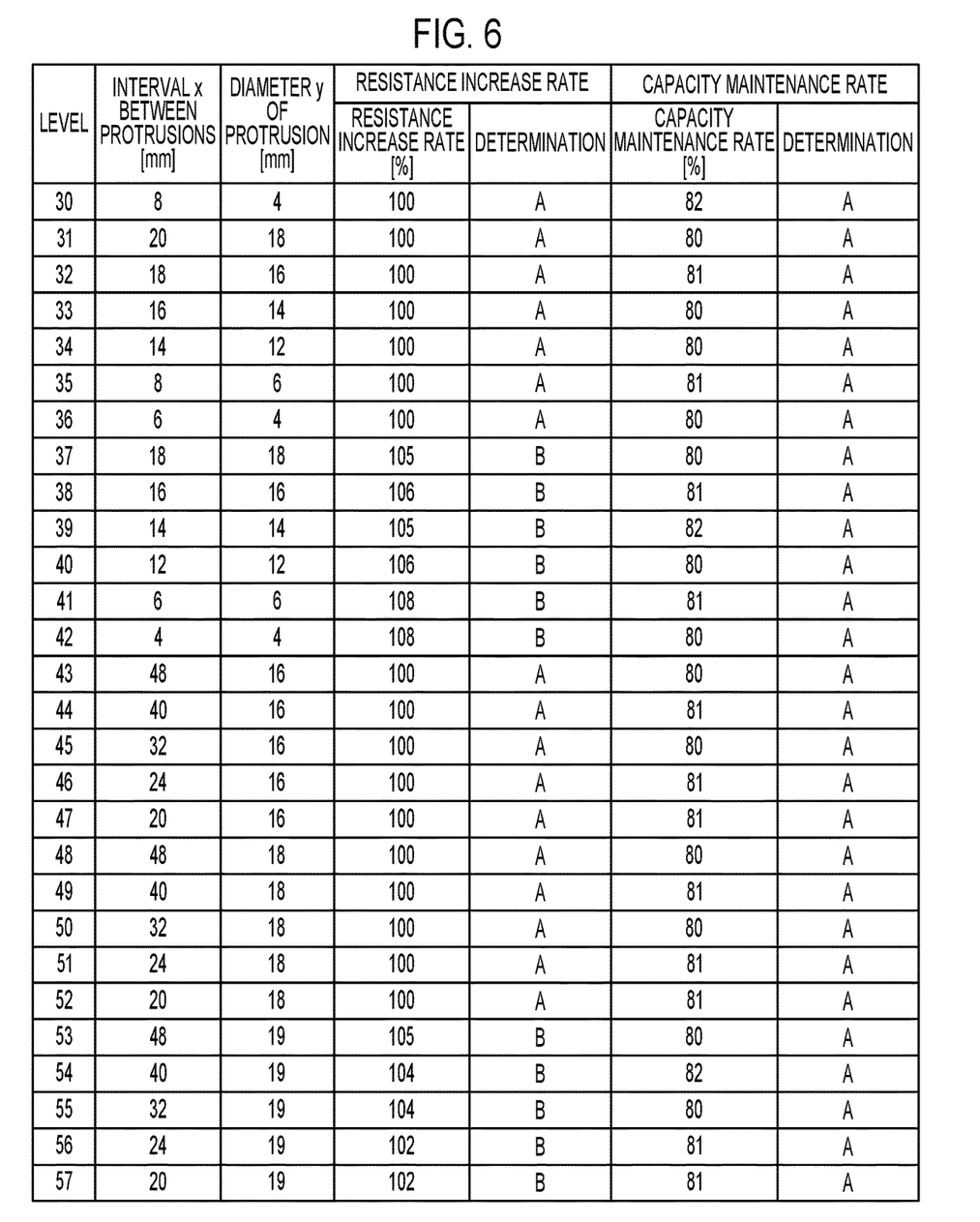
FIG. 6 is a table showing cycle test results.
Figure 7:
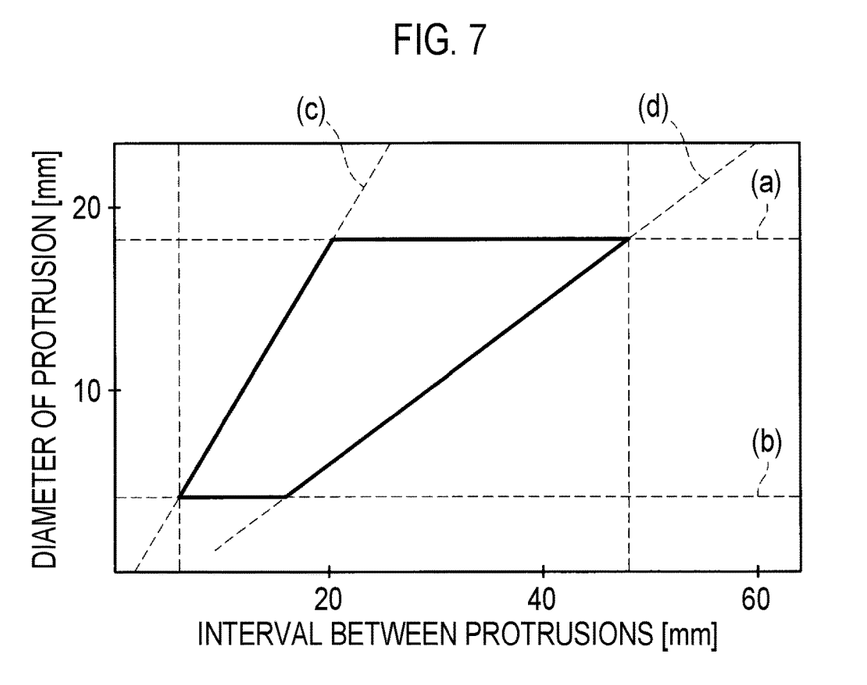
FIG. 7 is a graph showing cycle test results.

With respect to the above points, the present inventors verified a relationship between the structure of the elastic spacer 14 and the deterioration that occurs in the battery cell 12 in order to optimize the elastic spacer 14. In the verification, a cycle test for quantitatively evaluating the deterioration of the battery module 10 was conducted using the interval x and the diameter y in the protrusions 22 of the elastic spacer 14 as parameters. Specifically, the battery module 10 was subjected to 500 times of charging and discharging cycles, and changes in internal resistance and charging capacity before and after the cycles were measured. FIGS. 5 to 7 show the first verification results. In the cycle test, constant-current and constant-voltage (CCCV) charging was adopted. Charging conditions in this case are 4.25

V, 0.5 C, and a cutoff current of 0.1 C. On the other hand, discharging conditions are 2.8 V and 0.5 C.

With respect to FIGS. 5 to 7, a resistance increase rate represents a ratio of the internal resistance after the cycle test to the internal resistance before the cycle test. When the resistance increase rate is 100% or less, determination is made that the resistance value of the battery cell 12 was maintained, and a result of the determination is represented by "A" in FIGS. 5 and 6. On the other hand, when the resistance increase rate is larger than 100%, determination is made that the resistance value of the battery cell 12 increased, and a result of the determination is represented by "B" in FIGS. 5 and 6. A capacity maintenance rate represents a ratio of the charging capacity after the cycle test to the charging capacity before the cycle test. When the capacity maintenance rate is 80% or more, determination is made that the capacity maintenance rate is within an allowable range, and a result of the determination is represented by "A" in FIGS. 5 and 6. On the other hand, when the capacity maintenance rate is smaller than 80%, determination is made that the capacity maintenance rate is out of the allowable range, and a result of the determination is represented by "B" in FIGS. 5 and 6.

As shown in levels 53 to 57 of FIG. 6, when the diameter y of the protrusion 22 is 19 mm or more, determination is made that the resistance value of the battery cell 12 increased. This is considered to be because the diameter y of the protrusion 22 of the elastic spacer 14 is larger than needed and the expansion of the battery cell 12 is excessively restricted, so that the electrolyte in the battery cell 12 is discharged to the outside of the region between both electrodes. As a result, the present inventors found that when the diameter y of the protrusion 22 of the elastic spacer 14 is 18 mm or less, restricting the expansion of the battery cell 12 more than needed can be avoided. Here, a relationship that the diameter y of the protrusion 22 is 18 mm or less is represented by "y 18 mm" and corresponds to the straight line (a) in FIG. 7 and the region below the straight line (a).

As shown in levels 6, 9, and 20 to 24 in FIG. 5, when the diameter y of the protrusion 22 is 3 mm or less, determination is made that the capacity maintenance rate is out of the allowable range. This is considered to be because the diameter y of the protrusion 22 of the elastic spacer 14 is smaller than needed, the expansion of the battery cell 12 cannot be sufficiently restricted, and the distance between both electrodes in the battery cell 12 is increased. Accordingly, the present inventors found that when the diameter y of the protrusion 22 of the elastic spacer 14 is 4 mm or more, the increase in distance between both electrodes in the battery cell 12 can be suppressed. Here, a relationship that the diameter y of the protrusion 22 is 4 mm or more is represented by "4 mm y" and corresponds to the straight line (b) in FIG. 7 and the region above the straight line (b).

In addition to the above results, it was confirmed that even when the diameter y of the protrusion 22 is within a range of 4 mm to 18 mm, the resistance value of the battery cell 12 increased and the capacity maintenance rate decreased depending on the interval x between the protrusion 22. As a result, it was supported that an upper limit value and a lower limit value exist for the interval x between the protrusions 22 as well as the diameter y of the protrusion 22. This will be described in detail below.

First, a relationship between the resistance value of the battery cell 12 and the interval x between the protrusions 22 will be described. For example, when the diameter y of the protrusion 22 is 18 mm and the interval x between the protrusions 22 is 18 mm, the resistance value of the battery cell 12 increased (see level 37), while when the diameter y of the protrusion 22 is 18 mm and the interval x between the protrusions 22 is 20 mm or more, the resistance value of the battery cell 12 was maintained (see levels 25, 31, and the like). From these results, it was found that even when the diameter y of the protrusion 22 is within a range of 4 mm to 18 mm, in a case where the interval x between the protrusions 22 is smaller than needed, the expansion of the battery cell 12 is excessively restricted. Accordingly, in order to avoid the increase in resistance value of the battery cell 12, there is a need to set a lower limit value for the interval x between the protrusions 22 as well as the diameter y of the protrusion 22. Specifically, the interval x between the protrusions 22 needs to satisfy "y≤x−2". This relationship corresponds to the straight line (c) in FIG. 7 and the region below the straight line (c).

Next, a relationship between the capacity maintenance rate and the interval x between the protrusions 22 will be described. For example, when the diameter y of the protrusion 22 is 16 mm and the interval x between the protrusions 22 is 48 mm, the capacity maintenance rate is out of an allowable range (see level 11), and when the diameter y of the protrusion 22 is 16 mm and the interval x between the protrusions 22 is 40 mm or more, the capacity maintenance rate is within the allowable range (see levels 44 to 47 and the like). From these results, it was found that even when the diameter y of the protrusion 22 is within a range of 4 mm to 18 mm, in a case where the interval x between the protrusions 22 is larger than needed, the expansion of the battery cell 12 cannot be sufficiently restricted. Accordingly, there is a need to set an upper limit value for the interval x between the protrusions 22 as well as the diameter y of the protrusion 22. Specifically, the interval x between the protrusions 22 needs to satisfy "y≥4/9x−10/3". This relationship corresponds to the straight line (d) in FIG. 7 and the region above the straight line (d).

From the results of the above cycle test, it was found that when the interval x between the protrusions 22 and the diameter y of the protrusion 22 satisfy a predetermined relationship, the increase in distance between both electrodes in the battery cell 12 can be suppressed while avoiding restricting the expansion of the battery cell 12 more than needed. Here, the predetermined relationship refers to relationships of 4 mm≤y≤18 mm, y≥4/9x−10/3, and y≤x−2 with respect to the interval x between the protrusions 22 and the diameter y of the protrusion 22. This relationship coincides with the region surrounded by the straight lines (a) to (d) in FIG. 7. In the battery module 10 provided with the elastic spacer 14 satisfying the above relationship, the discharge of the electrolyte to the outside of the region between both electrodes is suppressed, to suppress or avoid the unintentional increase in resistance value of the battery cell 12, and the decrease in capacity of the battery cell 12 is suppressed.

Figure 8:
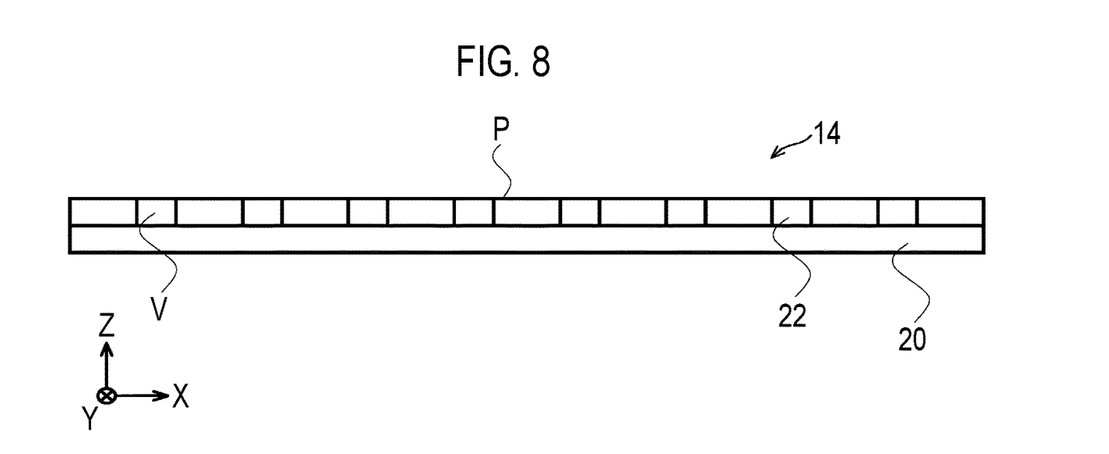
FIG. 8 is a side view of the elastic spacer showing a tangent plane and a volume fraction of a region occupied by a plurality of protrusions in a region located between a sheet portion and the tangent plane.
Figure 9:
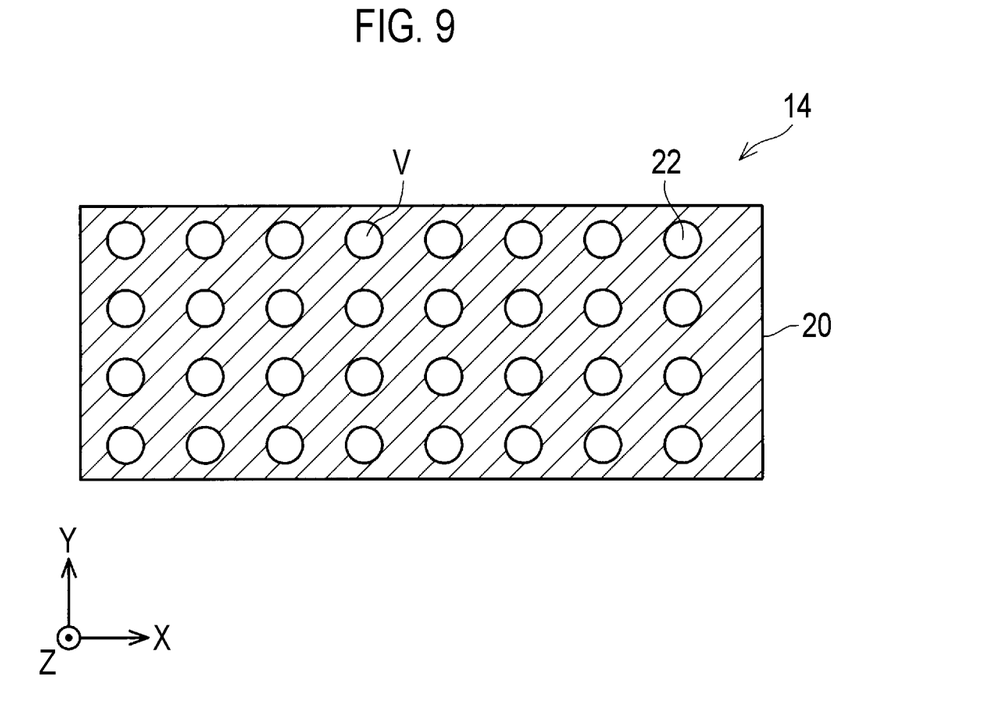
FIG. 9 is a plan view of the elastic spacer, in which the volume fraction of the region occupied by the protrusions in the region located between the sheet portion and the tangent plane is shown by a white portion.
Figure 10:
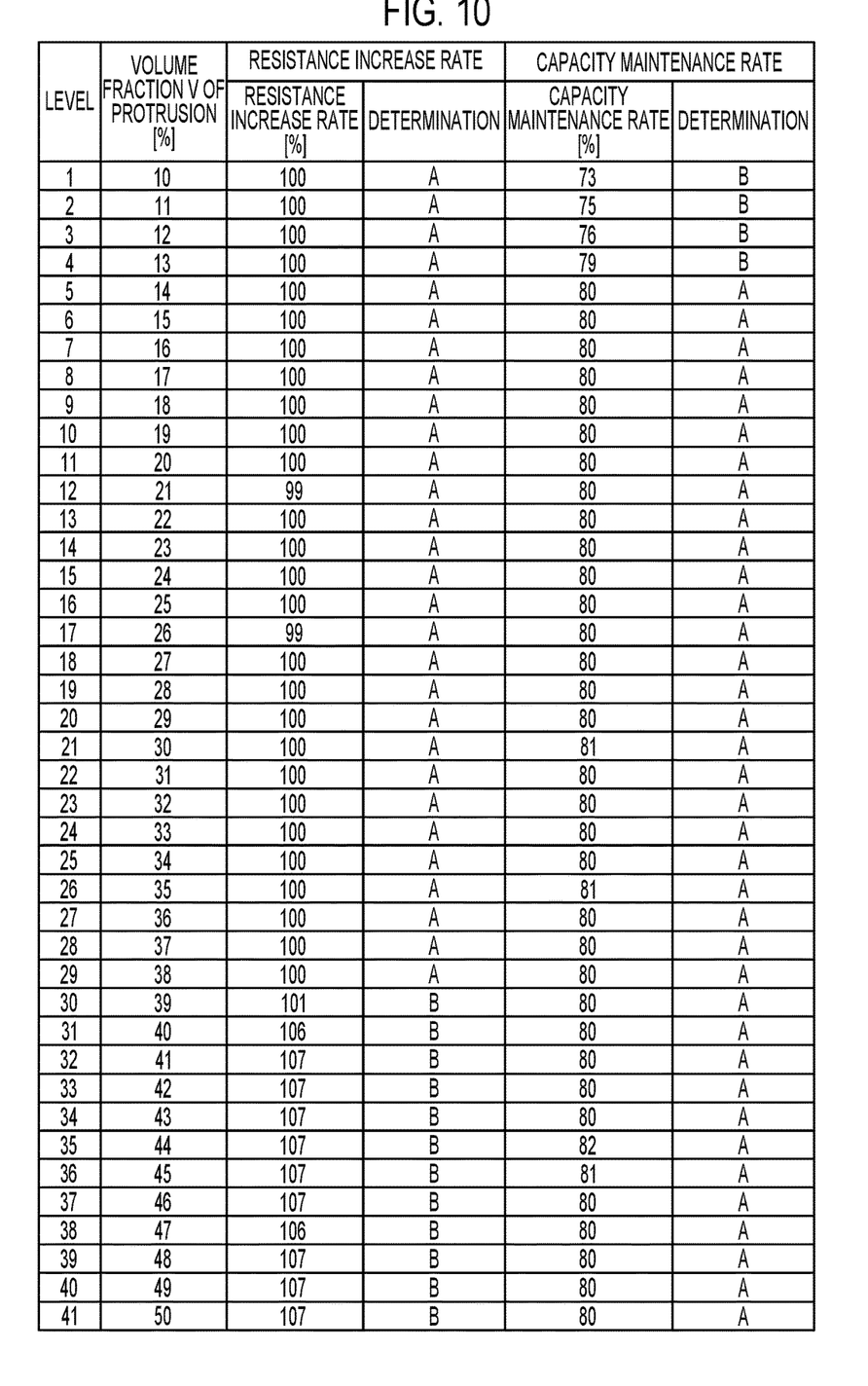
FIG. 10 is a table showing cycle test results.
Figure 11:
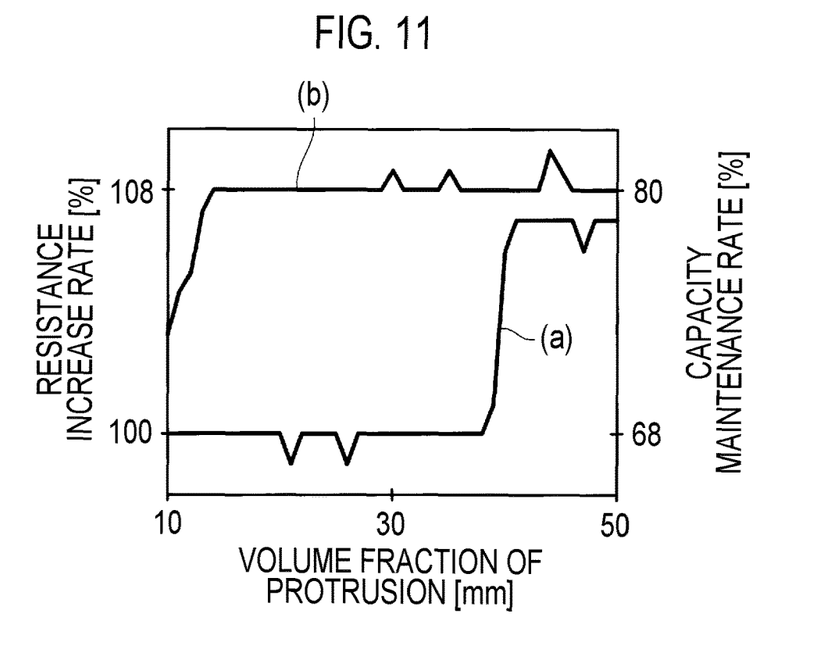
FIG. 11 is a graph showing cycle test results.

In addition to the first verification, the present inventors conducted a second verification to verify a relationship between the structure of the elastic spacer 14 and the deterioration that occurs in the battery cell 12 in order to optimize the elastic spacer 14. In the above verification, as shown in FIGS. 8 and 9, in the elastic spacer 14 having a natural shape removed from the battery module 10, a plane that is in contact with tips of the protrusions 22 and extends in parallel with the sheet portion is defined as a tangent plane P. In this case, a volume fraction V of a region occupied by the protrusions 22 in a region located between the sheet portion 20 and the tangent plane P (hereinafter, may be referred to as a "volume fraction V of the protrusions 22") is assumed. A cycle test for quantitatively evaluating the deterioration of the battery module 10 was conducted using the volume fraction V as a parameter. As in the first verification, the battery module 10 was subjected to 500 times of charging and discharging cycles, and changes in internal resistance and charging capacity before and after the cycles were measured. FIGS. 10 and 11 show the second verification results. In FIG. 11, the graph (a) shows the resistance increase rate, and the graph (b) shows the capacity maintenance rate. Since a method for determining the internal resistance and the charging capacity of the battery module 10 and charging conditions and discharging conditions in the cycle test are the same as the method and the conditions in the first verification, duplicate description is omitted.

As shown in levels 1 to 4 of FIG. 10, when the volume fraction V of the protrusions 22 is 13% or less, determination is made that the capacity maintenance rate is out of an allowable range. This is considered to be because the volume fraction V of the protrusions 22 of the elastic spacer 14 is smaller than needed, the expansion of the battery cell 12 cannot be sufficiently restricted, and the distance between both electrodes in the battery cell 12 is increased. Accordingly, the present inventors found that when the volume fraction V of the protrusions 22 of the elastic spacer 14 is 14% or more, the increase in distance between both electrodes in the battery cell 12 can be suppressed.

As shown in levels 30 to 41 of FIG. 10, when the volume fraction V of the protrusions 22 is 39% or less, determination is made that the resistance value of the battery cell 12 increased. This is considered to be because the volume fraction V of the protrusions 22 of the elastic spacer 14 is larger than needed and the expansion of the battery cell 12 is excessively restricted, so that the electrolyte in the battery cell 12 is discharged to the outside of the region between both electrodes. As a result, the present inventors found that when the volume fraction V of the protrusions 22 of the elastic spacer 14 is 38% or less, restricting the expansion of the battery cell 12 more than needed can be avoided.

From the above results, it was found that when the volume fraction V of the protrusions 22 of the elastic spacer 14 is 14% or more and 38% or less, the increase in distance between both electrodes in the battery cell 12 can be suppressed while avoiding restricting the expansion of the battery cell 12 more than needed. In this case, the discharge of the electrolyte to the outside of the region between both electrodes is suppressed, to suppress or avoid the unintentional increase in resistance value of the battery cell 12, and the decrease in capacity of the battery cell 12 is suppressed.

Although not particularly limited, in the battery module 10 of the present example, the elastic spacer 14 may satisfy both a predetermined relationship obtained from the first verification results and a predetermined relationship obtained from the second verification results. That is, the interval x and the diameter y in the protrusions 22 of the elastic spacer 14 may satisfy a relationships of 4 mm$\leq y \leq 18$ mm, $y \geq 4/9 x - 10/3$, and $y \leq x - 2$, the volume fraction V of the protrusions 22 may be 14% or more and 38% or less. With such a configuration, it is possible to suppress the increase in distance between both electrodes in the battery cell 12 while more reliably avoiding restricting the expansion of the battery cell 12 more than needed.

Figure 12:
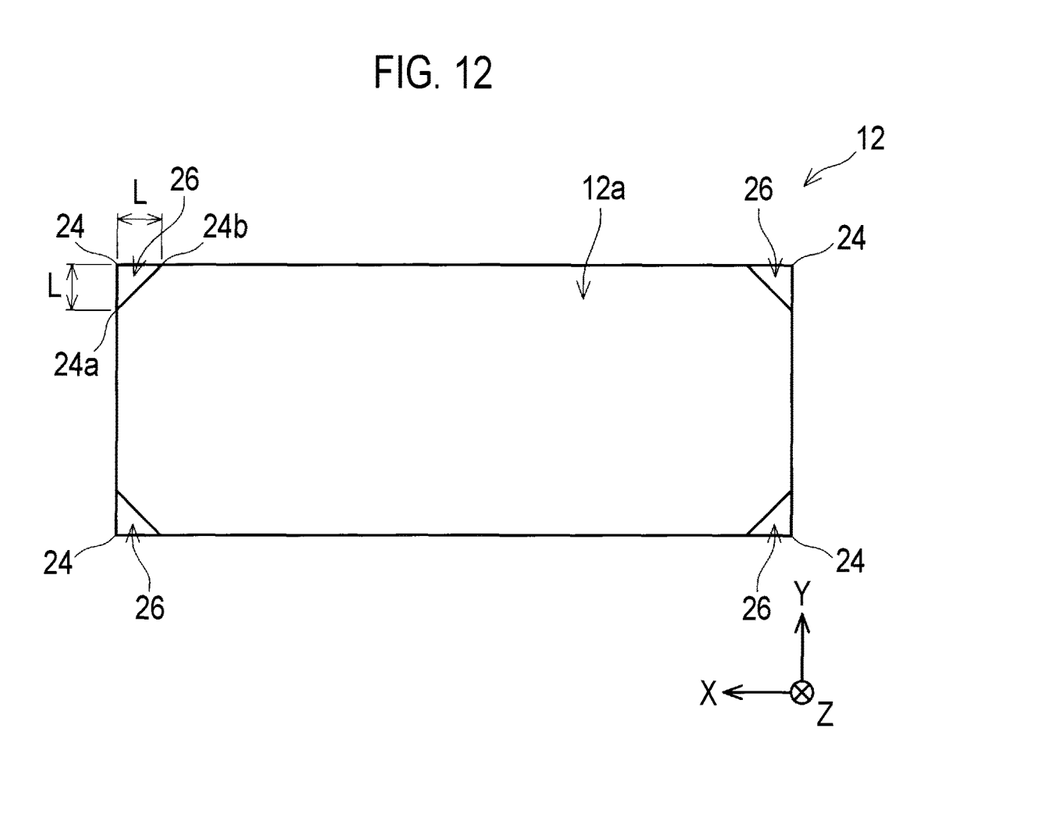
FIG. 12 is a diagram illustrating a corner-adjacent region of the battery cell.

As an example, in the battery module 10 of the present example, as shown in FIG. 12, a surface 12a of the battery cell 12 in contact with the protrusions 22 of the elastic spacer 14 has a rectangular shape having four corners 24, a pair of short sides, and a pair of long sides. A length of 5% of the short side is defined as a first length L, and a triangular region having, as apices, the corner 24, a point 24a on the short side separated from the corner 24 by the first length L, and a point 24b on the long side separated from the corner 24 by the first length L is defined as a corner-adjacent region 26 for each of the four corners 24. In this case, none of the protrusions 22 of the elastic spacer 14 is in contact with the corner-adjacent region 26 of the surface 12a of the battery cell 12. Within the surface 12a of the battery cell 12, the corner-adjacent region 26 has a relatively high rigidity, and a region other than the corner-adjacent region 26 has a relatively low rigidity. Therefore, when the battery cell 12 expands, the load applied to the battery cell 12 from the protrusion 22 of the elastic spacer 14 can be effectively transmitted to the inside of the battery cell 12, and the increase in distance between both electrodes in the battery cell 12 can be suppressed. With this, the decrease in capacity of the battery cell 12 is suppressed or avoided.

In the battery module 10 of the present example, each protrusion 22 need not necessarily have a cylindrical shape. As another embodiment, each protrusion 22 may have, for example, a hemispherical shape, a trapezoidal shape, or a prismatic shape. In addition, the protrusion 22 may have a shape in which a dimension in the X direction and a dimension in the Y direction are different from each other. Regardless of the shape of each protrusion 22, it is expected that the deterioration of the battery cell 12 is effectively suppressed by the protrusions 22 satisfying at least one of a predetermined relationship obtained from the first verification or a predetermined relationship obtained from the second verification.

Further, the protrusions 22 need not necessarily be disposed at an equal interval along both the X direction and the Y direction, and need only be disposed at an equal interval along at least one of the X direction or the Y direction. When the protrusions 22 are disposed at an equal interval along the X direction, an interval between the protrusions 22 in the X direction and a dimension of each protrusion 22 in the X direction need only satisfy a predetermined relationship obtained from the first verification. In addition, or alternatively, when the protrusions 22 are disposed at an equal interval along the Y direction, an interval between the protrusions 22 in the Y direction and a dimension of each protrusion 22 in the Y direction need only satisfy a predetermined relationship obtained from the first verification.

In the battery module 10 of the present example, the protrusions 22 need not necessarily have the same shape as each other. In addition, or alternatively, the protrusions 22 need not be disposed at an equal interval in one or both of the X direction and the Y direction. Also in such an embodiment, it is expected that the deterioration of the battery cell 12 is effectively suppressed by the protrusions 22 satisfying a predetermined relationship obtained from the second verification.

Although some specific examples have been described in detail above, these are merely examples and do not limit the scope of claims. The techniques described in the claims include various changes and modifications of the specific examples exemplified above. The technical elements described herein or in the drawings exhibit their technical utility, either alone or in combination.

What is claimed is:
1. A battery module comprising:
a plurality of battery cells each of which has a flat shape;
a plurality of elastic spacers laminated and disposed alternately with the battery cells; and a restraining member configured to restrain the battery cells and the elastic spacers in a laminating direction of the battery cells, wherein:

each of the elastic spacers has a sheet portion that extends between two adjacent battery cells and a plurality of protrusions that protrudes from one surface of the sheet portion;

the protrusions are disposed at an equal interval along at least a first direction; and when an interval between the protrusions in the first direction is x and a dimension of each protrusion in the first direction is y, all relationships of $4 \text{ mm} \leq y \leq 18 \text{ mm}$, $y \geq (4/9)x - 10/3$, and $y \leq x - 2$ are satisfied.

2. The battery module according to claim 1, wherein:

the protrusions are further disposed at an equal interval along a second direction perpendicular to the first direction;

an interval between the protrusions in the second direction is equal to the interval between the protrusions in the first direction; and a dimension of each protrusion in the second direction is equal to the dimension of each protrusion in the first direction.

3. The battery module according to claim 1, wherein each protrusion has a cylindrical shape.

4. The battery module according to claim 1, wherein the protrusions have the same shape as each other.

* * * * *